United States Patent [19]
Rossi

[11] 4,346,764
[45] Aug. 31, 1982

[54] ROTOTILLER WITH ANGULARLY DISPOSED TEETH

[76] Inventor: Joe Rossi, 2409 Soscol Ave., Napa, Calif. 94558

[21] Appl. No.: 183,338

[22] Filed: Sep. 2, 1980

[51] Int. Cl.³ ............................................ A01B 33/02
[52] U.S. Cl. ..................................... 172/42; 172/123; 172/540; 299/39; 299/89
[58] Field of Search ................. 172/42, 43, 120, 123, 172/540, 548, 545, 550, 555, 556; 299/39, 89; D15/12, 29

[56] References Cited

U.S. PATENT DOCUMENTS

| | | | |
|---|---|---|---|
| 1,179,257 | 4/1916 | Wilkinson | 172/556 X |
| 1,644,596 | 10/1927 | Krieger | 172/540 |
| 4,043,399 | 8/1977 | Morrison | 172/42 |

FOREIGN PATENT DOCUMENTS

| | | | |
|---|---|---|---|
| 632687 | 10/1934 | Fed. Rep. of Germany | 172/556 |
| 1186253 | 1/1965 | Fed. Rep. of Germany | 172/540 |
| 325913 | 3/1972 | U.S.S.R. | 172/540 |
| 612646 | 6/1978 | U.S.S.R. | 172/556 |

Primary Examiner—Richard T. Stouffer
Attorney, Agent, or Firm—Bielen and Peterson

[57] ABSTRACT

An improved rototiller having angulated tines which include a first tooth fixed to one portion of the tine and a second tooth fixed to a second portion of the tine angularly disposed in relation to the first portion of the tine.

7 Claims, 6 Drawing Figures

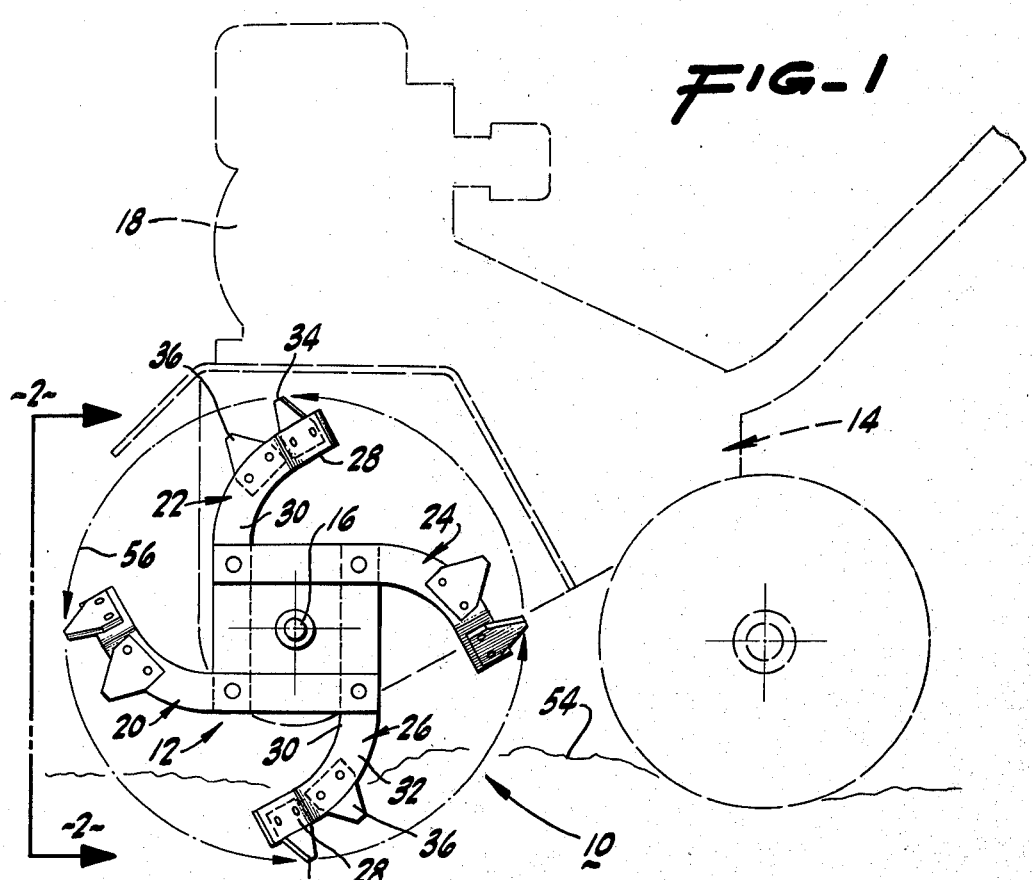
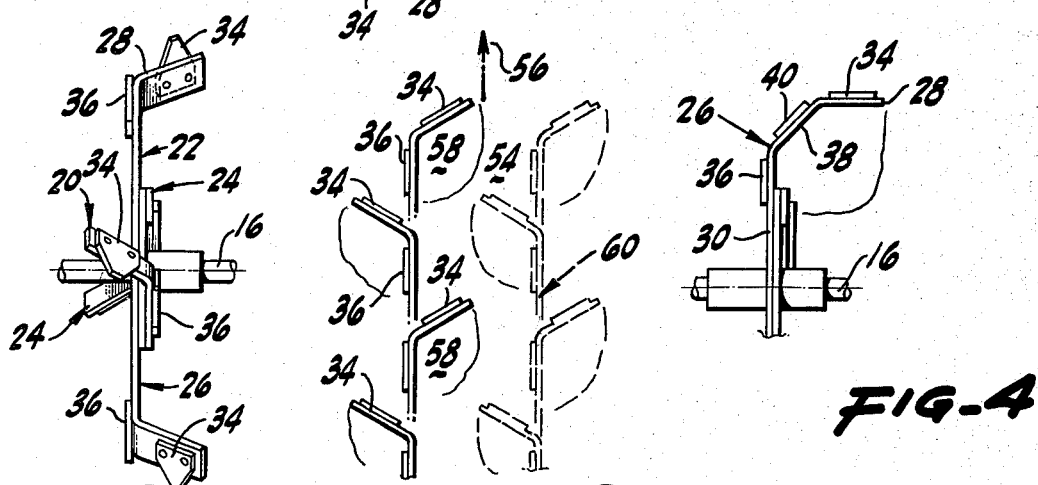
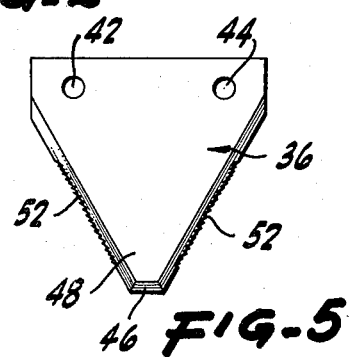
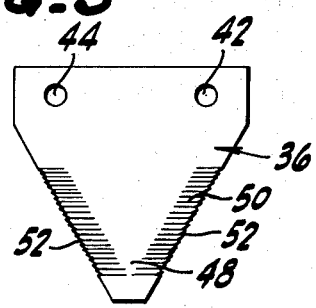

ROTOTILLER WITH ANGULARLY DISPOSED TEETH

BACKGROUND OF THE INVENTION

The present invention relates to a novel rototiller, and in particular, the structure of a novel tine mechanism.

Rototillers have been used extensively to cultivate planting areas previously cultivated by hand. The typical rototiller includes a multiplicity of tines which normally take the configuration of a bent blade. Rototillers are relatively easy to use where the ground being broken is soft or wet. However, cultivation of hard ground or clay based soils has proved exceedingly difficult with the one-person operated rototiller.

For example, U.S. Pat. No. 4,843,399 describes a rototiller mechanism having a single tooth which is projected forward at an angle ahead of the tine radius, but lacks the cutting ability necessary for cultivation of hard earth.

A novel rototiller tine structure which would more easily penetrate and scoop the earth being tilled would be desirable to reduce the size of the motor needed to operate a rototiller and well as decrease the expenditure of human energy by the operator of the rototiller.

SUMMARY OF THE INVENTION

In accordance with the present invention a novel and useful tine mechanism for a rototiller is provided.

The rototiller of the present invention includes a conventional motor driven axle. The tine mechanism is connected to the motor driven axle and includes at least one tine of angular configuration. However, the tine mechanism may include a plurality of tines circumferentially spaced about the axle. More particularly, each tine includes a first portion and a second portion angularly disposed in relation to the first portion. Both portions of the tine include a common edge.

A first tooth affixes to the first portion of the tine and extends beyond the edge thereof. The tooth may be formed into a generally triangular configuration with a beveled cutting edge, but is deemed to be limited to this configuration. The first tooth may be removably fixed to the first portion of the tine to permit the replacement thereof should the tooth strike a hard object and break during the rototilling operation.

A second tooth affixes to the second portion of the tine which is angularly disposed in relation to the first portion of the tine. Again, the second tooth extends beyond the edge of the second portion of the tine. In this manner, the rotating tine or tines of the rototiller, each having a pair of teeth affixed thereto, would produce cuts in the earth being tilled which are spaced from one another. In the case where each tooth has an edge, a pair of elongated cuts would be produced on the soil being tilled.

The rototiller tine construction of the present invention may also include fixing a third tooth to an intermediate portion of the tine located between the first and second portions hereinbefore described. It should be noted that each of the teeth may be removably affixed to the several portions of the tine or tines on the rototiller mechanism. Along these lines, each of the tines of a rototiller may include the affixed teeth described above.

It may be apparent that a novel and useful rototiller has been described.

It is therefore an object of the present invention to provide an improved rototiller which is capable of tilling relatively hard earth which is not tillable by a conventional rototiller.

It is another object of the present invention to provide an improved rototiller which quickly and efficiently cultivates soil thus requiring a motor which is much smaller than a comparable rototiller of conventional design.

It is yet another object of the present invention to provide a rototiller which can be safely operated by the average person in a home garden.

It is another object of the present invention to provide a rototiller which may be constructed from a commercially available rototiller.

It is still another object of the present to provide a rototiller which may be easily repaired if a hard object such a rock is struck during usage of the same.

The invention possesses other objects and advantages especially as concerns particular characteristics and features thereof, which will become apparent as the specification continues.

BRIEF DESCRIPTION OF THE DRAWINGS

FIG. 1 is a side elevational view of the tine mechanism of the present invention working in conjunction with a rototiller depicted in phantom.

FIG. 2 is a view taken along the line 2—2 of FIG. 1.

FIG. 3 is a top plan view of a portion of the tine mechanism shown in FIG. 2 with a plan view of a second tine mechanism shown in phantom in operation.

FIG. 4 is a top plan view of another embodiment of the tine mechanism of the present invention.

FIG. 5 is a front elevational view of a tooth of the tine mechanism of the present invention.

FIG. 6 is a rear elevational view of a tooth of the tine mechanism of the present invention.

Various aspects of the present invention will evolve from the following detailed description of the preferred embodiments thereof, which should be taken in conjunction with the hereinabove described drawings.

DESCRIPTION OF THE PREFERRED EMBODIMENTS

Various aspects of the present invention will evolve from the following detailed description of the preferred embodiments thereof, which should be taken in conjunction with the heretofore described drawings.

The invention as a whole is represented in the drawings by reference character 10 and includes as one of its elements tine mechanism 12. Tine mechanism 12 is used in conjunction with a conventional rototiller 14 which includes a motor driven axle 16 activated by motor means 18. The tine mechanism also includes a plurality of tines, 20, 22, 24, and 26, FIG. 1. Each tine, such as tine 26, includes a first portion 28 and a second portion 30 angularly disposed in relation to the first portion 28, FIG. 2. Tine portions 28 and 30 include an edge 32 which may be the cutting edge of a conventional rototiller tine mechanism. Tines 20, 22, 24, and 26 may be constructed of hard steel or of other materials which are capable of serving as a cultivation tool.

A first tooth 34 affixes to first portion 28 of each of the tines 20, 22, 24, and 26. Again, for the purpose of clarity, tine 26 will be used as an exemplar of the remaining tines of tine mechanism 12. Tooth 34 may be fixed by welding, bolting, or by the use of any other fastening means. As shown in the figures, tooth 34 has been rivoted to first portion 28 of tine 26. A second tooth 36 affixes to second portion 30 of tine 26 in the same manner as tine 34 affixes to first portion 28 of tine 26. Teeth 34 and 36 extend beyond edge 32 of tine 26 such that irritation of tine mechanism 12 will cause teeth 34 and 36 to strike the ground surface being cultivated before any other portion of tine 26. Tine mechanism 12 fastens to axle 16 in a conventional manner such as the mechanism employed in the Sears Roto-Spader distributed by the Sears Roebuck Company of Chicago, Ill.

The tine mechanism depicted in FIG. 2 may include a second of such mechanisms along axle 16, not shown. The operation of the tine mechanism of the present invention will be described hereinafter in greater detail.

Turning to FIG. 4 is may be seen that tine 26 may include an intermediate portion 38 between first portion 28 and second portion 30 thereof. A third tooth 40 may be affixed to intermediate portion 26 in the same manner as teeth 34 and 36 are affixed to tine 26, hereinbefore described.

Turning to FIGS. 5 and 6 it may be seen that teeth 34, 36, and 40 are similarly formed. Tooth 36, by way of example, includes openings 42 and 44 which are used in cooperation with the rivoting mechanism employed to fix tooth 36 to tine 26. Each tooth may be formed into a triangular member having a beveled edge 46 terminated in a truncated end 48. Striations 50 may be used to aid in the cutting of any sodden material found on the surface of the soil being worked. Striations 50 result in a serrated edge 52.

In operation, FIG. 3, tine 26 and the remaining tines penetrate ground surface 54 while traveling in the direction of arrow 56 such that tooth 34 and tooth 36 cut surface 54 in directions which are different from one another. This action, in effect, loosens the soil of ground surface 54 by defining at least two sides of a cavity 58 which will be loosened and possibly scooped from ground surface 54. As may be seen, the remaining tines create an alternating pattern of cavities. In conjunction with tine mechanism 12 a second tine mechanism may be oriented to create alternate cavities adjacent the cavities formed by tine mechanism 12. The overall result is that tine mechanism 12 thoroughly cultivates the ground surface 54. The addition of teeth 34 and 36 greatly aids in this endeavor by creating multiple penetrations into ground surface 54, not heretofore possible with a rototiller of conventional design, especially in very hard soils. Teeth 34 and 36 may be easily replaced by fastening a replacement tooth if one should break while striking a hard object such as a rock. In the conventional rototiller design the entire tine mechanism required replacement if broken during operation.

While in the foregoing specification embodiments of the invention have been set forth in considerable detail for the purposes of making a complete disclosure of the invention, it will be apparent to those of ordinary skill in the art that numerous changes may be made in such details without departing from the spirit and principles of the invention.

What is claimed is:

1. In a rototiller of earth having at least one tine, said rototiller further having a motor driven axle about the axis of which said at least one tine rotates, the tine including a first portion, said first portion being disposed at a substantial angle with respect to said axis, said tine further including a second portion substantially angularly disposed in relation to said first portion and also with respect to said substantial angle of said first portion with respect to said axis, each of said tine portions having a first edge continuous with the first edge of the other of said tine portions, and a second edge continuous with the second edge of the other of said tine portions, said first edge of each of said tine portions being adapted for contacting the earth before said second edge of each of said tine portions during the rotation of said at least one tine, the improvement comprising:
   a. a first tooth affixed to the first portion of the at least one tine, said first tooth having a dimension along the first portion of the at least one tine and extending beyond the first edge of said first portion of the at least one tine for penetration of the earth along said first tooth dimension;
   b. a second tooth affixed to the second portion of the at least one tine angularly disposed in relation to the first portion of the at least one tine, said second tooth having a dimension along the second portion of the at least one tine and extending beyond the first edge of said second portion of the at least one tine for penetration of the earth along said second tooth dimension, said first and second teeth being affixed to the tine such that said earth penetrations along said first and second teeth dimensions form an angle with one another.

2. The improved rototiller of claim 1 in which each of said affixed teeth have a cutting edge angularly oriented in relation to one another.

3. The improved rototiller of claim 2 in which the at least one tine further includes a portion intermediate the first and second portions, the intermediate portion having an edge contiguous with the edges of the first and second portions of the at least one tine, and a third tooth affixed to the intermediate portion of the at least one tine, said third tooth extending beyond the edge of the intermediate portion.

4. The improved rototiller of claim 2 in which the at least one tine of the rototiller includes a plurality of such tines each having a first and second tooth affixed thereto.

5. The improved rototiller of claim 4 in which each of the plurality of tines includes a portion intermediate the first and second portion, the intermediate portion having an edge contiguous with the edges of the first and second portions of the at least one tine.

6. The improved rototiller of claim 1 in which said first and second tooth are removably affixed to the at least one tine.

7. The improved rototiller of claim 1 in which each said tooth includes at least one serrated edge.

* * * * *